(12) United States Patent
Zavriyev et al.

(10) Patent No.: US 7,606,371 B2
(45) Date of Patent: Oct. 20, 2009

(54) TWO-WAY QKD SYSTEM WITH ACTIVE COMPENSATION

(75) Inventors: Anton Zavriyev, Swampscott, MA (US); Alexei Trifonov, Boston, MA (US); Michael LaGasse, Nahant, MA (US)

(73) Assignee: MagiQ Technologies, Inc., New York, NY (US)

( * ) Notice: Subject to any disclaimer, the term of this patent is extended or adjusted under 35 U.S.C. 154(b) by 780 days.

(21) Appl. No.: 10/876,847

(22) Filed: Jun. 25, 2004

(65) Prior Publication Data

US 2005/0135627 A1 Jun. 23, 2005

Related U.S. Application Data

(60) Provisional application No. 60/531,724, filed on Dec. 22, 2003.

(51) Int. Cl.
H04L 9/08 (2006.01)
(52) U.S. Cl. .................. 380/283; 380/44; 380/256; 396/39; 396/40
(58) Field of Classification Search .......... 380/278, 380/283
See application file for complete search history.

(56) References Cited

U.S. PATENT DOCUMENTS 5,307,410 A * 4/1994 Bennett .................. 380/256
5,675,648 A 10/1997 Townsend
6,028,935 A 2/2000 Rarity et al.
6,188,768 B1 2/2001 Bethune et al.
6,438,234 B1 * 8/2002 Gisin et al. .................. 380/256
7,227,955 B2 * 6/2007 Trifonov et al. ............. 380/256
7,333,611 B1 * 2/2008 Yuen et al. .................. 380/256
2002/0097874 A1 * 7/2002 Foden et al. ................. 380/256
2004/0032954 A1 * 2/2004 Bonfrate et al. ............. 380/263
2005/0094818 A1 * 5/2005 Inoue et al. ................. 380/278

FOREIGN PATENT DOCUMENTS

GB 2 392063 A 2/2004

OTHER PUBLICATIONS

Hughes et al., "Quantum Key Distribution over a 48 lan optical fibre network," Journal of modan optics, 2000 vol. 47 No. 2/3 xy-533-547.
Ribordy et al., "automated 'plug & play' Quantum key distribution" elec. lett. Oct. 29, 1988, vol. 54, pp. 2116-2117.

(Continued)

*Primary Examiner*—Kambiz Zand
*Assistant Examiner*—Amare Tabor
(74) *Attorney, Agent, or Firm*—Opticus IP Law PLLC

(57) ABSTRACT

A two-way actively stabilized QKD system that utilizes control signals and quantum signals is disclosed. Because the quantum signals do not traverse the same optical path through the system, signal collisions in the phase modulator are avoided. This allows the system to have a higher transmission rate than a two-way system in which the quantum signals traverse the same optical path. Also, the active stabilization process, which is based on maintaining a fixed relationship between an intensity ratio of interfered control signals, is greatly simplified by having the interferometer loops located all in one QKD station.

16 Claims, 12 Drawing Sheets

OTHER PUBLICATIONS

Kersey et al., "Polarization—insensitive fibre-optic Michelson interferometer," elec. lett. Mar. 14, 1991 vol. 27, No. 6 pp. 88-520.

Breguet et al., "Interferometer using a 3x3 Coupler & Faraday Mirrors," Opt. lett., Jun. 15, 1995 vol. 20, No. 12, pp. 1447-1449.

Meier, "Stabile interferometrie des nicht linearen Brech Zahl-Koeffi Zienten von Qortz-glasfasern der oprischen nachrichten technik" sections 4.3-4.4-thesis published in 1994, Univ.Karlsruhe ISBN 3-18-344308-2.

* cited by examiner

TWO-WAY QKD SYSTEM WITH ACTIVE COMPENSATION

CLAIM OF PRIORITY

This patent application claims priority from U.S. Provisional Patent Application Ser. No. 60/531,724, entitled "Stabilized one-way QKD system," filed on Dec. 22, 2003, which Patent Application is incorporated by reference herein.

FIELD OF THE INVENTION

The present invention relates to quantum cryptography, and in particular relates to quantum key distribution (QKD) systems.

BACKGROUND OF THE INVENTION

Quantum key distribution involves establishing a key between a sender ("Alice") and a receiver ("Bob") by using weak (e.g., 0.1 photon on average) optical signals transmitted over a "quantum channel." The security of the key distribution is based on the quantum mechanical principle that any measurement of a quantum system in unknown state will modify its state. As a consequence, an eavesdropper ("Eve") that attempts to intercept or otherwise measure the quantum signal will introduce errors into the transmitted signals, thereby revealing her presence.

The general principles of quantum cryptography were first set forth by Bennett and Brassard in their article "Quantum Cryptography: Public key distribution and coin tossing," Proceedings of the International Conference on Computers, Systems and Signal Processing, Bangalore, India, 1984, pp. 175-179 (IEEE, New York, 1984). Specific QKD systems are described in U.S. Pat. No. 5,307,410 to Bennett, and in the article by C. H. Bennett entitled "Quantum Cryptography Using Any Two Non-Orthogonal States", Phys. Rev. Lett. 68 3121 (1992).

The general process for performing QKD is described in the book by Bouwmeester et al., "The Physics of Quantum Information," Springer-Verlag 2001, in Section 2.3, pages 27-33. During the QKD process, Alice uses a random number generator (RNG) to generate a random bit for the basis ("basis bit") and a random bit for the key ("key bit") to create a qubit (e.g., using polarization or phase encoding) and sends this qubit to Bob.

The above mentioned patent and publication by Bennett each describe a so-called "one-way" QKD system wherein Alice randomly encodes the polarization or phase of single photons at one end of the system, and Bob randomly measures the polarization or phase of the photons at the other end of the system. The one-way system described in the Bennett 1992 paper is based on two optical fiber Mach-Zehnder interferometers. Respective parts of the interferometric system are accessible by Alice and Bob so that each can control the phase of the interferometer. The interferometers need to be actively stabilized to within a portion of quantum signal wavelength during transmission to compensate for thermal drifts.

U.S. Pat. No. 6,028,935 (the '935 patent), which patent is incorporated by reference herein, discloses a one-way QKD system that utilizes two unbalanced Mach-Zehnder interferometers located at different ends of the system. There are two main problems with such one-way interferometers used for QKD. One problem involves time variance of the quantum signal polarization. One needs to know the polarization state of the quantum signal precisely as it arrives at Bob's apparatus, otherwise it is very difficult to modulate the signal and keep the interferometer balanced.

The '935 patent tries to address this problem by adding a polarization controller. The polarization controller is needed to ensure a fixed polarization at Bob. However, this adds complexity and expense to the system, as well as unwanted attenuation.

A similar invention to the '935 patent described in Great Britain Patent Application Publication No. GB 2 392063, wherein the QKD system includes a polarization scrambler at Alice to ensure randomness over the Poincare sphere. Note that the scrambling rate needs to be faster than the time rate of change of the PMD of the transmission fiber and faster than the quantum signal detection rate. Also, a polarization scrambler placed at Alice decreases the system's security and adds additional complexity and expense to the system, as well as unwanted attenuation.

Another problem with a one-way QKD system involves temperature drift in the interferometer, which causes a phase shift that destroys the intended interference. In a real-world version of the system of the '935 patent, the sending and receiving stations are separated by a great distance so that they have to be independently thermally controlled, which adds complexity and expense to a commercially viable version of the '935 patent QKD system.

U.S. Pat. No. 6,438,234 to Gisin (the '234 patent), which patent is incorporated herein by reference, discloses a so-called "two-way" QKD system that is autocompensated for polarization and thermal variations. The QKD system of the '234 patent requires that the optical pulses traverse the same optical paths but in different order, which makes the system less susceptible to environmental effects than a one-way system. However, because the photons need to traverse the same path, they must pass twice through Bob's modulator. Thus, as the bit rate goes up, the probability of finding both an outgoing and an incoming pulse passing through the modulator at the same time increases, thereby limiting the system's bit rate.

SUMMARY OF THE INVENTION

A first aspect of the invention is a method of stabilizing a QKD system. The QKD station exchanges quantum signals between two QKD stations. The first QKD station has a least first and second interferometer loops. The method includes sending first and second control signals from the first interferometer loop to the second interferometer loop without the control signals passing to the second QKD station. The method also includes detecting first and second interfered control signals created from the first and second control signals by the second interferometer loop. The first and second interfered control signals having respective first and second intensities $I_1$ and $I_2$. The method further includes maintaining the ratio $I_1/I_2$ constant by adjusting the phase of one arm of the second interferometer.

A second aspect of the invention is a QKD system. The system includes a a first QKD station that includes first and second interferometer loops. The first interferometer loop generates two quantum signals from a single quantum signal. The system also includes a second QKD station optically coupled to the first QKD station via an optical fiber connection. The second QKD station is adapted to randomly modulate at least one of the two quantum signals and return the two quantum signals to the first QKD station over the optical fiber link. The first QKD station also includes a signal-directing element (e.g., a beam splitter or a circulator) arranged in the first QKD station. The signal-directing element directs the two returned quantum signals to the second interferometer loop. The system also includes a detection stage coupled to an output end of the second loop. The detection stage is adapted to detect two interfered quantum signals created by the second interferometer loop from the two returned quantum signals.

A third aspect of the invention is a method of performing QKD. The method includes forming two quantum signals and two control signals in a first interferometer loop of a first QKD station having first and second interferometer loops. The control signals precede the quantum signals. The method also includes transmitting the control signals and quantum signals to a second QKD station that modulates at least one of the quantum signals and returns the quantum signals and the control signals to the first QKD station. The method further includes receiving the two returned quantum signals and the two returned two control signals at the first QKD station and directing the two received quantum and the two received control signals to the second interferometer loop. This directing is performed to prevent the two quantum signals from traversing the same optical path through the system, and also prevents the two control signals from traversing the same optical path through the system.

Figure 1:
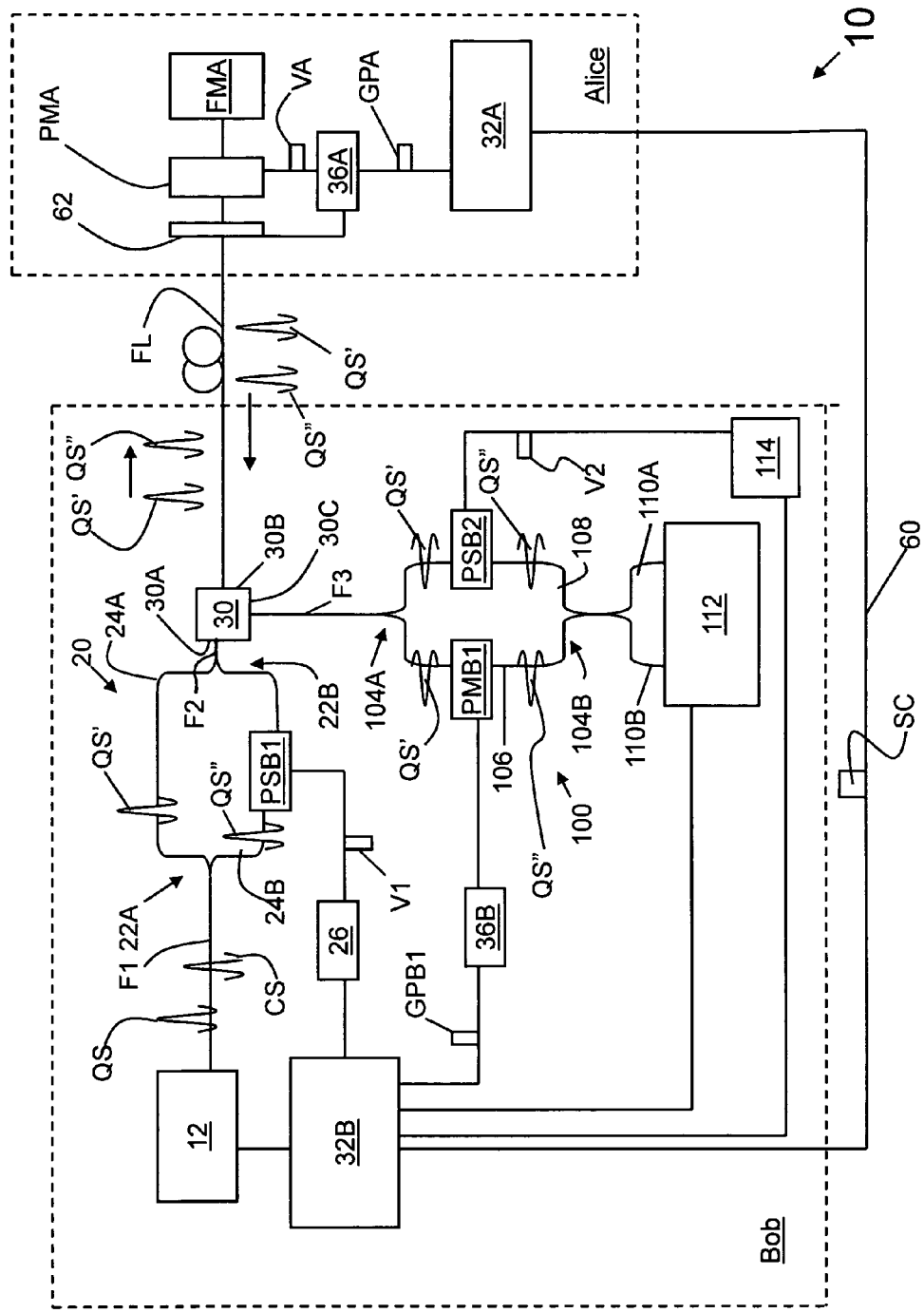
FIG. 1 is a schematic diagram of an example embodiment of an actively stabilized two-way QKD system of the present invention, wherein Bob has two interferometer loops.

The various elements depicted in the drawings are merely representational and are not necessarily drawn to scale. Certain sections thereof may be exaggerated, while others may be minimized. The drawings are intended to illustrate various embodiments of the invention that can be understood and appropriately carried out by those of ordinary skill in the art.

DETAILED DESCRIPTION OF THE INVENTION

The present invention relates to quantum cryptography, and in particular relates to a stabilized two-way quantum key distribution (QKD) system. The present invention includes a two-way QKD system that is actively stabilized. The design of the system allows for a higher bit rate than that possible with prior art two-way systems that rely on autocompensation by having signals traverse identical paths. Several different embodiments of the invention are described below. A so-called "two-loop" embodiment is first described, and then the other embodiments are described in relation to the two-loop embodiment.

In the description below, "loop" is sometimes used as shorthand for "interferometer." Also, the phrase "quantum signals" is used to denote those signals (optical pulses) associated with a quantum channel and that are used to establish a quantum key. Initially, the quantum signals leaving Bob need not be "quantum signals" in the literal sense, i.e., they need not have a photon number of 1 photon or less.

Also the phrase "control signals" is used to denote those signals associated with the active compensation process.

Further, the phrase "interfered quantum signal" is used to describe the result of the interference of two of the quantum signals that return from Alice and that interfere in loop 100 or in loops 100 and 200. The phrase "interfered control signal" is used to describe the result of interference of two of the control signals in loop 100 or in loops 100 and 200.

I. Two-Loop Embodiment

FIG. 1 is a schematic diagram of a first example embodiment of a QKD system 10. System 10 includes a first QKD station "Bob" and a second QKD station "Alice." The configuration of Bob is first described below, followed the configuration of Alice. The general method of operation of system 10 is then described, followed by a description of how the active compensation of the system is performed.

Bob

With continuing reference to FIG. 1, Bob includes a quantum and control signals preparation (QCSP) stage 12 that prepares a quantum signal QS and a control signal CS. QCSP stage 12 is optically coupled via a first segment of polarization-maintaining (PM) optical fiber F1 to a first fiber interferometer ("loop") 20 via a first polarization-maintaining (PM) coupler 22A. Loop 20 has first and second arms 24A and 24B formed from PM optical fiber, wherein the first arm includes a phase shifter PSB1. Phase shifter PBS1 is coupled to a voltage controller 26, which provides a voltage signal V1 that sets the phase of the phase shifter.

First and second arms 24A and 24B come together at a second PM coupler 22B. PM coupler 22B is coupled to an input end 30A of a signal-directing element 30 via a second segment of PM optical fiber F2. In an example embodiment, signal-directing element 30 is a polarizing beam splitter. A single-mode optical fiber link FL is coupled to element 30 at an output end 30B opposite input end 30A. The other end of the optical fiber link FL is connected to Alice, which is described below.

In another example embodiment, signal-directing element 30 is a PM circulator, where the input and output ends 30A and 30B are two of the ports of the circulator.

Bob further includes a controller 32B coupled to QCSP stage 12 for controlling the generation of the quantum signal QS and the control signal CS. Controller 32B is also coupled to voltage controller 26, which is adapted to set the level of voltage signal V1 and to synchronize the various signals for coordinated operation of the QKD system.

QCSP Stage

Figure 2A:
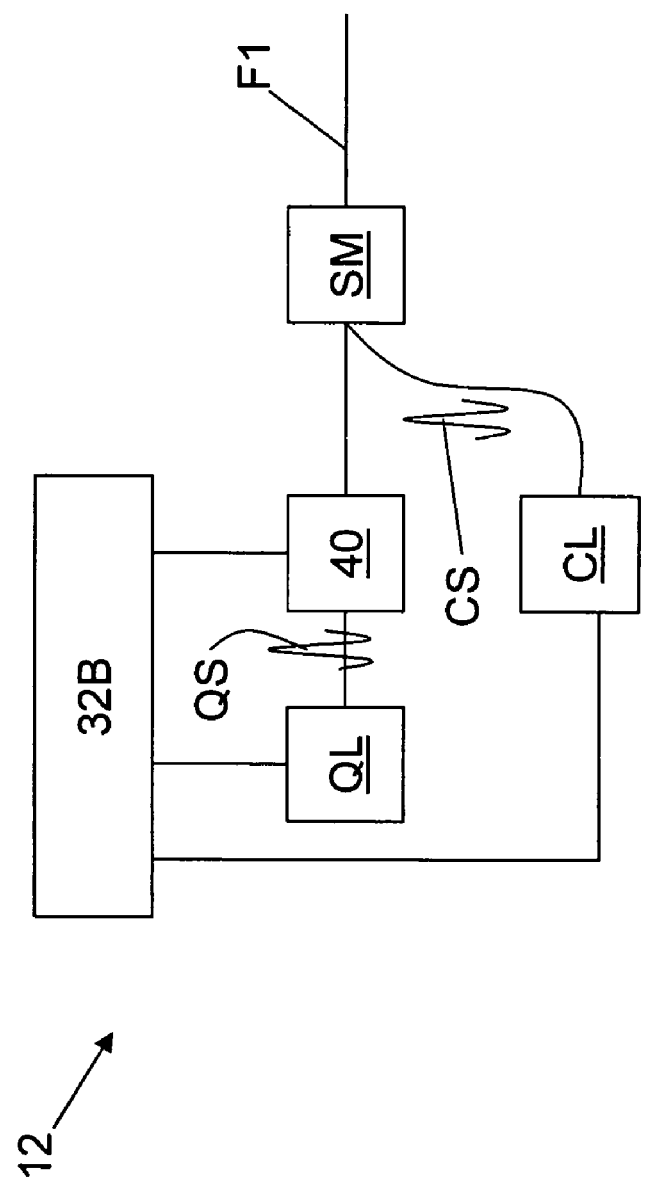
FIG. 2A is a schematic diagram of a first example embodiment of the quantum and control signals preparation (QCSP) stage of the system of FIG. 1, that includes multiplexed separate light sources for the control and quantum signals.
Figure 2B:
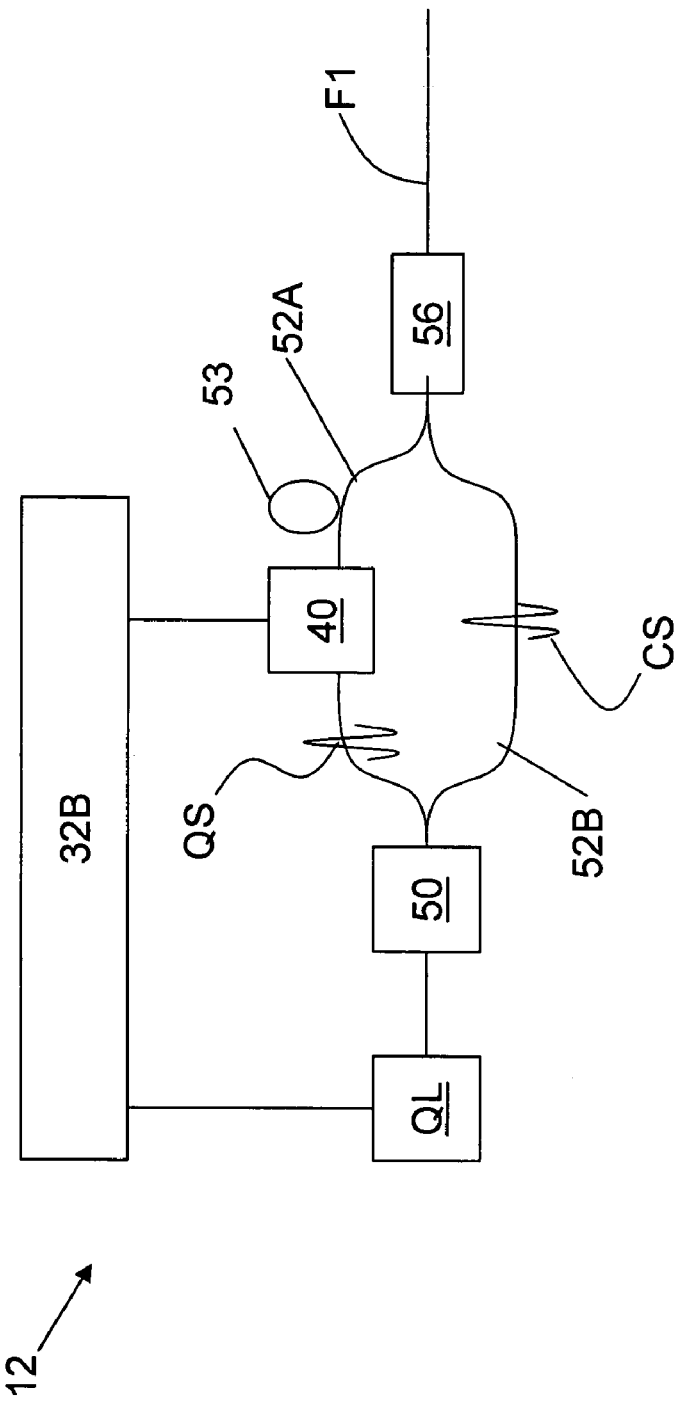
FIG. 2B is a schematic diagram of a third example embodiment of the QCSP of the system of FIG. 1, wherein a single light source is used to generate the quantum signal and the control signal.

FIGS. 2A-2B are schematic diagrams illustrating different example embodiments of QCSP stage 12. With reference to FIG. 2A, QCSP stage 12 includes a light source QL, such as a laser, for generating quantum signal QS. Light source QL is coupled to controller 32B, and is also optically coupled to a variable attenuator (VOA) 40 so that quantum signals QS may be attenuated. QCSP stage 12 also includes a control light source CL, such as a laser that generates control signal CS. Control light source CL and (quantum) light source QL are optically coupled to a signal multiplexer SM that combines the control signals CS with the quantum signals QS and feeds them into fiber section F1.

In an example embodiment where the control signals CS and quantum signals QS, have a different wavelength, the signal multiplexer SM is a wavelength division multiplexer (WDM) coupler.

In an example embodiment, an alternative location of VOA 40 is downstream from signal multiplexer SM.

FIG. 2B is a schematic diagram that illustrates an example embodiment of QCSP stage 12 similar to that of FIG. 2A, wherein light source QL is used to generate both control signal CS and quantum signal QS. Thus, light source QL is coupled to a polarization-maintaining (PM) coupler 50 having two arms 52A and 52B. The first arm 52A includes VOA 40 and a polarization-maintaining delay section 53. The first and second arms 52A and 52B are combined using a second PM beam combiner 56, which feeds into fiber section F1. Thus, a single output pulse (not shown) from light source QL is split into two pulses, and one of the pulses serves as the quantum signal while the other pulse serves as the control signal CS.

In the above-described embodiments of QCSP stage 12, the output of the stage feeds into loop 20 via optical fiber section F1 so that both the quantum signal and the control signal travel through loop 20 and over the fiber link FL to Alice.

In an example embodiment, the quantum signal and control signal light sources QL are controlled by controller 32B so that the signals are delayed with respect to one another (e.g., the control signal CS precedes the quantum signal QS).

Second Interferometer Loop

With reference again to FIG. 1, Bob includes a second interferometer (loop) 100 that has two PM couplers 104A and 104B connected by two arms 106 and 108. Coupler 104B has two output branches 110A and 110B coupled to a detection stage 112, which is discussed in greater detail below.

Loop 100 is coupled to polarizing beam splitter 30 via a PM optical fiber section F3 connected to PM coupler 104A. A phase modulator PMB1 is included in one arm of loop 100, such as arm 106 as shown, and a phase shifter PSB2 is included in the other arm. Phase shifter PSB2 is coupled to a voltage controller 114, which is coupled to controller 32B. Voltage controller 114 generates a voltage control signal V2 to set phase shifter PSB2 to a select phase shift value.

Controller 32B includes or is coupled to a random number generator (RNG) unit 36B, which in turn is coupled to phase modulator PMB1. The RNG unit 36B provides random numbers used to randomly select phase modulator states from a predetermined group of phase modulator states in accordance with a given key exchange protocol.

Alice

With continuing reference to FIG. 1, Alice includes a phase modulator PMA coupled to optical fiber link FL, and a Faraday mirror FMA coupled to phase modulator PMA via an optical fiber section FA. Alice also includes an RNG unit 36A coupled to phase modulator PA. RNG 36A is in turn coupled to a controller 32A, which is coupled to Bob's controller 32B via a synchronization ("sync") channel (e.g., a fiber link or Ethernet link) 60. Alice also includes a VOA 62 coupled to controller 32A for attenuating signals leaving Alice.

Method of Operation

The method of operation of system 10 is now described. With continuing reference to FIG. 1, QCSP stage generates quantum signal QS and control signal CS. Quantum signal QS travels over optical fiber section F1 to PM coupler 22A, which splits quantum signal QS into two quantum signals QS' and QS". Quantum signal QS' travels over arm 24A while quantum signal QS" travels over arm 24B including through phase shifter PSB1 so that quantum signal QS" is delayed relative to quantum signal QS'.

The two quantum signals QS' and QS" are then coupled into optical fiber section F2 by PM coupler 22B. The quantum signals then enter input face 30A of polarizing beam splitter 30 and exit output face 30B, and then enter optical fiber link FL. At this point, the quantum signals QS' and QS" are preferably relatively strong pulses relative to the true quantum signal strength of one photon or less on average that ultimately is used to exchange keys between the stations.

Pulses QS' and QS" proceed over optical fiber link FL to Alice, where they pass through VOA 62 and phase modulator PMA, reflect from Faraday mirror FMA, and return through the phase modulator and the VOA. The Faraday mirror serves to rotate the polarization of the pulses by 90° degrees. While one of the pulses (say, QS') is passing through phase modulator PMA, the phase modulator is activated to impart a random phase to the signal as selected from a set of possible phases. This is accomplished via a timed gating pulse GPA from controller 32A that activates RNG unit 36A to provide the appropriate voltage signal VA to the phase modulator.

The timing of the gating pulse is accomplished via a sync signal SC send over sync channel 60 from controller 32B to controller 32A. An example system and method of performing synchronization and timing for system 10 is described in PCT Patent Application Ser. No. PCT/U.S. 2004/03394, entitled "QKD systems with robust timing," which patent application is incorporated herein by reference.

The quantum pulses then travel back over optical fiber link FL to Bob. The pulses enter output face 30B of signal-directing element 30. However, rather than traveling back through loop 20 and thus over the same optical path, the quantum signals, which are now polarized orthogonal to their original polarization, are redirected by signal-redirecting element 30 to a second output face 30C and into optical fiber section F3. This prevents the returned quantum signals from passing back through the first phase modulator PMB1, thereby permitting more outgoing pulses to pass through the modulator. This allows for a higher QKD transmission rate.

Returned quantum signal QS' and QS" encounter PM coupler 104A, which splits each signal in two, thereby creating four quantum signals, with two of these signals traveling over arm 106 and the remaining two signals traveling over arm 108. In arm 106, while one of the pulses (say, QS') traveling in that arm passes through phase modulator PMB1, the phase modulator is activated to impart to it a random phase. This is accomplished via a timed gating pulse GPB1 from controller 32B that activates RNG unit 36B to provide the appropriate voltage signal V3 to the phase modulator. Likewise, in arm 108, the quantum signals traveling through phase shifter PSB2 are phase shifted by a select amount according to the voltage signal V2 provided by voltage controller 114.

The quantum signals in each arm then proceed to coupler 104B, where they are recombined. The combined signals are then detected at detection stage 112 as a single combined or "integrated" quantum signal QSI.

The control signal CS precedes the quantum signal QS and is divided into two control signals CS' and CS", which follow the same paths as quantum signals QS' and QS" and are further split in two, modulated and combined in the same way as the quantum signals.

Figure 3A:
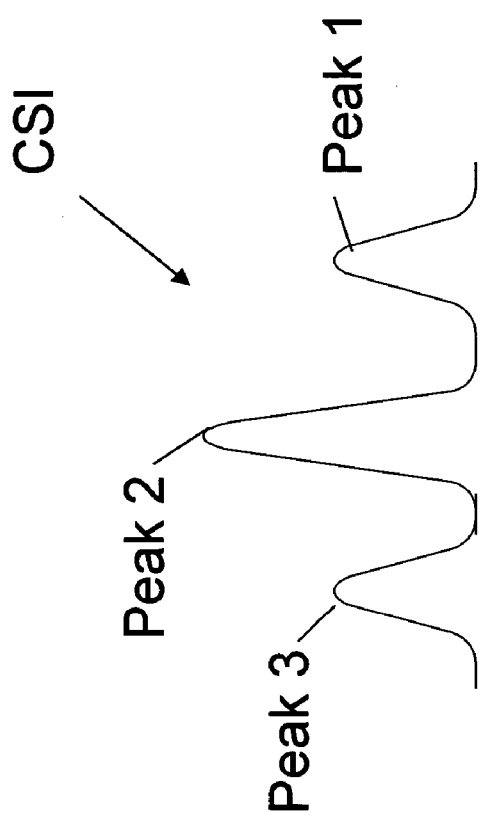
FIGS. 3A and 3B are plots of the three-peak Intensity I vs. time t interference signal pattern arriving present at each arm of the detection stage for the control signal (CSI) and quantum signal (QSI), respectively.
Figure 3B:
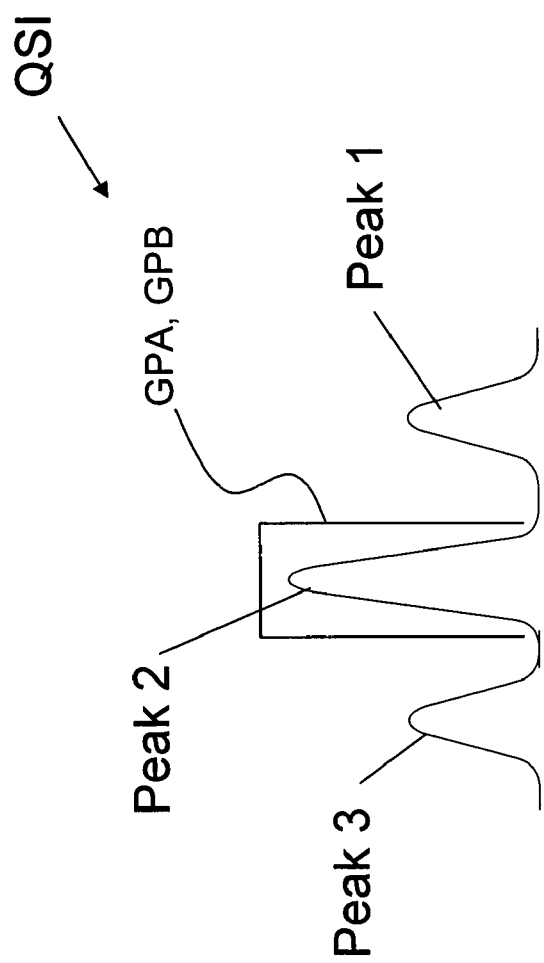

With reference FIGS. 3A and 3B, the integrated quantum signal QSI and the integrated control interference signal CSI each consists of three peaks separated in time. The first signals to arrive form the first peak and are those that traveled the shortest route in loops 20 and 100. The last signals to arrive form the third peak are those that traveled the longest path in loops 20 and 100. The signals that take the "short+long path" arrive in the middle and interfere, thus forming the large middle (second) peak, denoted "Peak 2."

The detection of the quantum signals in detection stage 112 and the role of the control signals for active compensation of system 10 is now explained below.

QKD System Stabilization

Stabilization of QKD system 10 is achieved by using feedback from the integrated control signal. Here, control signal CS is a "classical" signal having the same or different wavelength as the quantum signal QS, and follows the same path through the interferometric system as the quantum signal.

Figure 4:
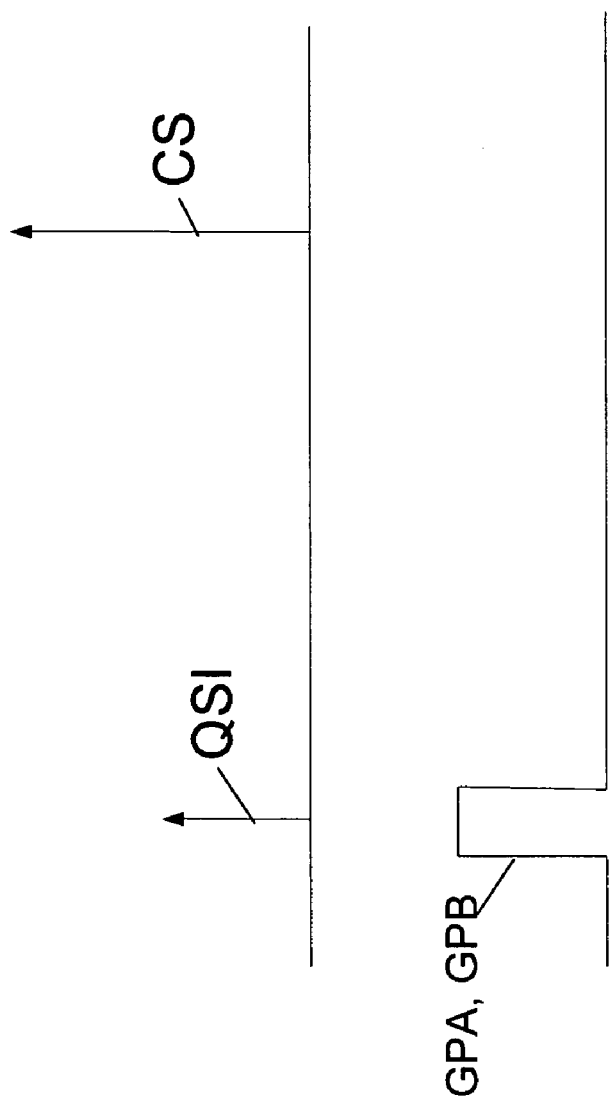
FIG. 4 is a timing diagram illustrating the relative timing of the quantum signal and the control signal, along with the timing of the detector gating pulse for the quantum interference signal that selects the central peak.

As described above, the control signal CS precedes the quantum pulse (in the time domain). Thus, in an example embodiment it is used to trigger the timing/synchronization scheme between Alice's controller 32A and Bob's controller 32B via sync channel link 60. For security reasons, Alice's phase modulator is not activated when a control pulse is launched. The timing of the quantum channel signal, the control channel signal and the gating signal are shown in the timing diagram of FIG. 4.

Detection Stage

Figure 5:
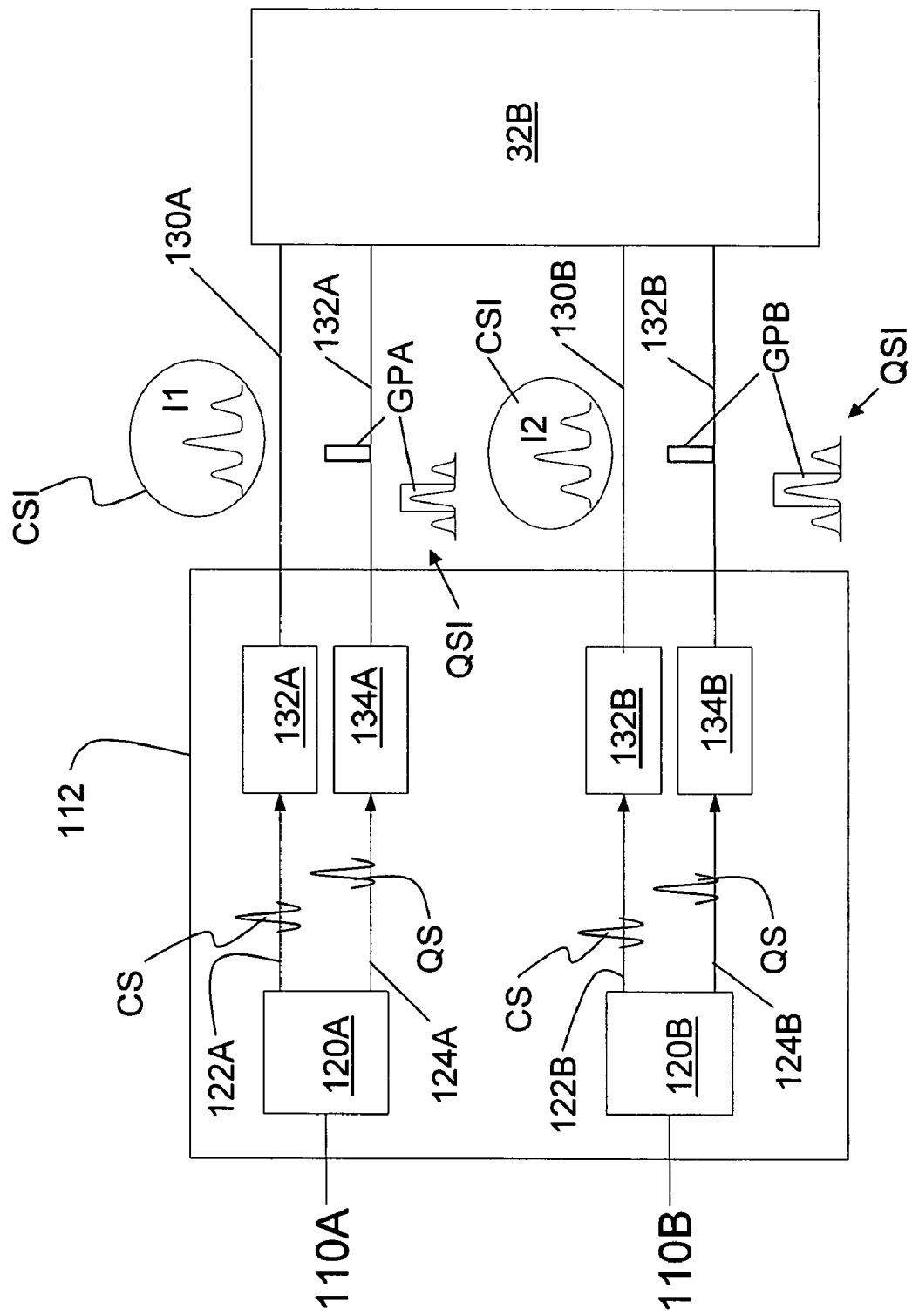
FIG. 5 is a schematic diagram of an example embodiment of the detection stage for the case where different wavelengths are used for the quantum and control signals, and showing the resulting three-peak interference signal pattern at each detector arm for the control and quantum signals.

FIG. 5 is a schematic diagram of detection stage 112 of FIG. 1. Detection stage 112 includes for each input optical fiber 110A and 110B stemming from the PM coupler 104B respective signal demultiplexers 120A and 120B. Signal demultiplexer 120A has a control signal output link 122A and a quantum signal output link 124A that carry the demultiplexed quantum and control signals, respectively. The control signal output link 122A is coupled to a detector (i.e., a photodetector) 132A, and the quantum signal output link 124A is coupled to a single photon detector (SPD) 134A.

Likewise, signal demultiplexer 120B has a control signal output link 122B and a quantum signal output link 124B that carries the demultiplexed quantum and control signals, respectively. The control signal output link 122B is coupled to a detector (i.e., a photodetector) 132B, and the quantum signal output link 124B is coupled to a single photon detector (SPD) 134B.

There are four outputs 130A 132A and 130B and 132B from the detection stage 112. Outputs 130A and 130B are the two photodetector outputs and outputs 132A and 132B are the SPD outputs. Controller 32B provides gating pulses GPA and GPB that select the central peak in the interfered quantum signals.

Controller 32B receives and stores the two multi-peaked integrated control signals CSI (CSIA and CSIB) from detectors 132A and 132B. The integrated control signals CSIA and CSIB have respective intensity profiles $I_1$ and $I_2$. The profile of control signal CSI is illustrated in FIG. 3A and the quantum signal QSI is illustrated in FIG. 3B. Except for a phase shift, the interfered control signals have the same form as the interfered quantum signals, since these signals follow the same path through the QKD system 10. Use of control signals CSI for system stabilization is discussed below.

If the same wavelength is used for the quantum and control signals, the signal demultiplexers can each be either a fast optical switch or a splitter. The detectors 132A and 132B can be standard telecom detectors for corresponding wavelengths.

For each control signal CSIA and CSIB, integrated intensities $I_1$ and $I_2$, are detected. There is no need to gate detectors 132A and 132B to register only interference signal (FIG. 3A). However, SPDs 134A and 134B need to be gated with respective gating pulses GPA and GPB from controller 32B (see FIG. 1) to detect the central interference pulse 140 of the interfered quantum signal QSI. This is also illustrated in FIG. 3B and in the timing diagram of FIG. 4.

Also, if the control and quantum signals have different wavelengths, then signal demultiplexers 120A and 120B can be common WDM filters. The amount of polarization mode dispersion (PMD) from the system components and the fiber transmission depends on the wavelengths used.

Since the amount of time needed for a light signal to travel over the fiber link FL is relatively small, time-dependent PMD should not be a significant concern if it changes slowly compared to the temporal pulse separation. For further applications, one has to keep in mind that maximums for the two wavelengths will not necessarily coincide.

The same wavelength for the quantum and control signals can also be used, e.g., via the embodiment for the QCSP stage shown in FIG. 2B and discussed above. In this embodiment, a single laser pulse is split in two—a weak control signal QS for the quantum channel and a strong control signal CS used for the control channel. This method requires a delay between the quantum signal with respect to control signal for a number of nanoseconds. This can be accomplished, for example, with a time delay mechanism such as a long single-mode fiber spool.

Also, the quantum and control signals have to be separated at Bob's detection stage(s). For this purpose, the signal demultiplexers 120A and 120B can be fast optical switches or splitters. If splitters are used, however, there is a danger in triggering an avalanche in a SPD used for detection of the quantum signal.

In the stabilization process, a constant total phase delay $\phi$ in the interferometer assumes a certain signal distribution in Bob's detectors 132A and 132B:

$$I_1 = const_1 + \cos(\phi) \quad I_2 = const_2 - \cos(\phi)$$

wherein I represents intensity and the constants $const_1$ and $const_2$ originate from short-short and long-long pulses, since there is no gating of the control signal detectors. To stabilize the system, the ratio of the interfered control signals $I_1$ and $I_2$ is kept constant. The value of the ratio does not change with signal polarization.

The ratio $I_1/I_2$ is recorded in controller 32B as a function of the phase shifter voltage VS2 provided to PSB2. An example plot of this ratio is shown in FIG. 6, which shows that the induced phase shift is proportional to voltage V2 applied to phase shifter PSB2.

Figure 6:
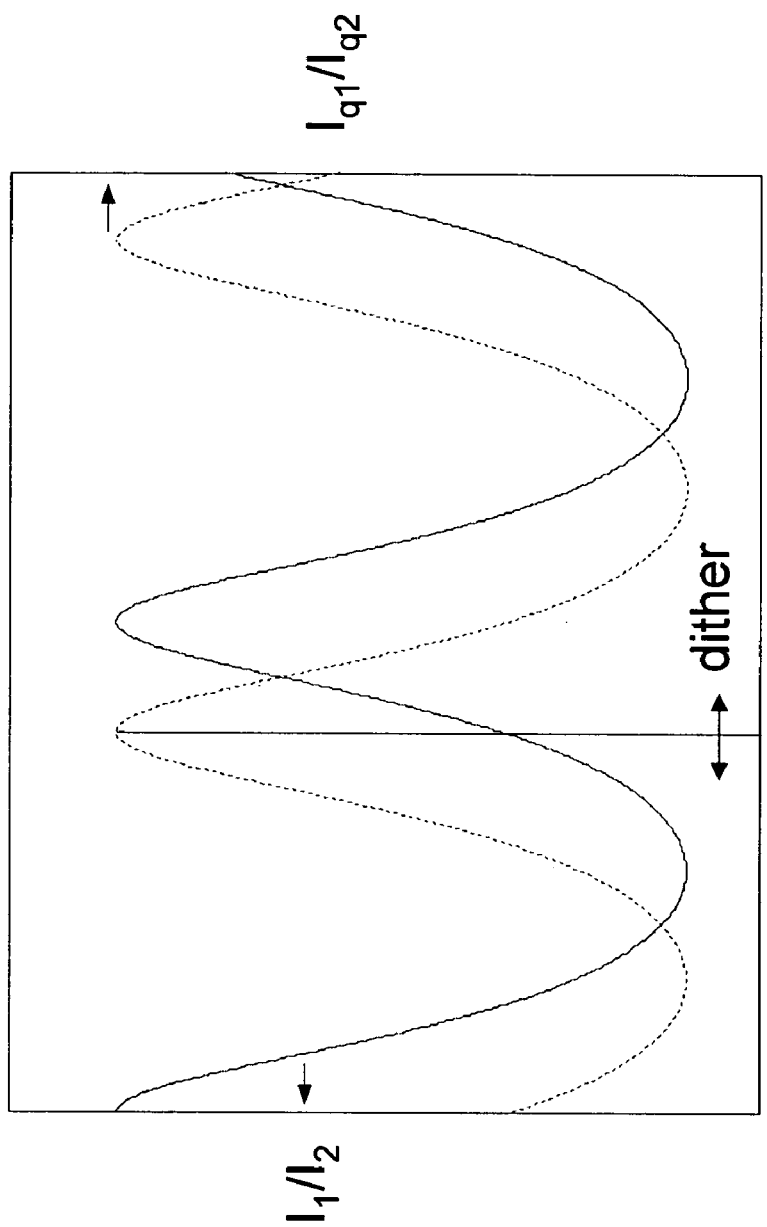
FIG. 6 is a plot of the two control signal interference patterns corresponding to the two detector branches, illustrating the procedure for QKD system stabilization, wherein the solid curve corresponds to the control signal, and dashed curve corresponds to quantum signal, and wherein the vertical line corresponds to maintaining the relative positions of the two curves by the controller adjusting the voltage signal provided to the phase shifter PSB2 of interferometer loop 100.

First, the phase shifter voltage V2 is scanned to induce larger than $2\pi$ phase shift (i.e., more than 1 period in FIG. 6). Next, a voltage V2 corresponding to a specific user-defined (or set-point) ratio $I_1/I_2$ is applied to phase shifter PSB2. Because thermal and/or mechanical effects induce a phase difference between the two interferometer arms 20 and 100, the set-point will move on a curve, as shown in FIG. 6.

To keep a fixed ratio $I_1/I_2$, fast dithering is performed in a feed-back loop. That is, for a few small applied voltage steps for V2, the ratio $I_1/I_2$ is measured and this data is saved in controller 32B, and voltage corresponding to a set-point value is applied to phase shifter PSB2. The time constant of this feedback-loop should be smaller than the time constant associated with thermal and/or mechanical drifts of the interferometer arms 20 and 100.

Once the stabilization voltage is determined, (e.g., using continuous feedback-loop with dithering), the control channel set-point is adjusted to maximize or minimize the curve associated with the integrated quantum signal QSI. The integrated quantum signals QSI from SPDs 134A and 134B are accumulated for a given time frame. The goal is to find a maximum of the $I_{1q}/I_{2q}$ ratio for the integrated quantum signal. Further on, the phase shifter voltage $V2_{MAX}$ that corresponds to max $I_{1q}/I_{2q}$ for the SPDs count in a given loop at Bob is used to stabilize the corresponding loop.

Quantum and Control Wavelengths

In a preferred embodiment, the control signals CS and the quantum signals QS are sufficiently close in wavelength to each other to prevent phase walk-off.

Since SPDs 134A and 134B need to discriminate between the peaks of the quantum interference signal, the peak separation needs to be greater than a gating signal period. For example, a gating time of $T_{gate}=2$ ns is reasonable for a QKD system. Thus, an example safe peak separation distance is ~5 ns in time domain or, in terms of length of optical fiber, $\Delta L = L - S = 1$ m, where L is the length of the longer arm of a half-interferometer and S is a length of the shorter arm.

In an example embodiment, loops 20 and 100 are identical (lengthwise) and Bob is thermally stabilized to within a temperature differential $\Delta T$. An advantage of the present invention over one-way systems is that the interferometer loops are located in a single QKD station (Bob) so that they can all be conveniently thermally stabilized. In the discussion below, $\lambda_Q$ and $\lambda_S$ are the respective quantum and control signal wavelengths.

For example, if the temperature of one of the loops in Bob drifts by $\Delta T$ (degrees C.), the physical path difference will change by approximately $1.6 \times 10^{-5} \times \Delta T \times \Delta L$, where $1.6 \times 10^{-5}$ is the factor of linear thermal expansion (degrees$^{-1}$) for a standard SMF 28 fiber. In the units of wavelengths, this becomes $(1.6 \times 10^{-5} \times \Delta T \times \Delta L)/\lambda_Q$ and $(1.6 \times 10^{-5} \times \Delta T \times \Delta L)/\lambda_S$ for quantum and control channels, respectively. In terms of phase, this phase becomes $[2\pi \times (1.6 \times 10^{-5} \times \Delta T \times \Delta L)/\lambda_Q]$ and $[2\pi \times (1.6 \times 10^{-5} \times \Delta T \times \Delta L)/\lambda_S]$ radians. (To be precise, dispersion needs to be taken into account, but its contribution is negligible in comparison).

Thus, the phase difference between two waves, $\Delta\phi$, changes by $\delta(\Delta\phi) = [2\pi \times (1.6 \times 10^{-5} \times \Delta T \times \Delta L)/\lambda_Q] - [2\pi \times (1.6 \times 10^{-5} \times \Delta T \times \Delta L)/\lambda_S] = 2\pi \times (1.6 \times 10^{-5} \times \Delta T \times \Delta L) \times \Delta\lambda)/\lambda_Q\lambda_S$, (where $\Delta\lambda = \lambda_S - \lambda_Q$) Since $\Delta\lambda << \lambda_S$ (or $\lambda_Q$), the last equation can be re-written as $\delta(\Delta\phi) = 2\pi \times (1.6 \times 10^{-5} \times \Delta T \times \Delta L) \times \Delta\lambda/\lambda^2$, where $\lambda$ is substituted for either $\lambda_S$ or $\lambda_Q$.

If the interferometer visibility is assumed to be better than 26 dB (which is a reasonable practical assumption), the phase of the quantum light source QL needs to be controlled to within $\Delta\phi_Q \sim 3°$ (or 0.05 radians) of the designated value (0 or $\pi$). If it is assumed that the control laser phase can be controlled with an absolute precision, this would imply that $\delta(\Delta\phi) < \delta\phi_Q$, or $2\pi \times (1.6 \times 10^{-5} \times \Delta T \times \Delta L) \times \Delta\lambda/\lambda^2 < \delta\phi_Q$. Thus, the laser wavelengths should satisfy the criterion $\Delta\lambda < (\lambda^2 \times \delta\phi_Q)/(2\pi)/(1.6 \times 10^{-5} \times \Delta T \times \Delta L)$ and are inversely proportional to the precision of temperature control. This, for example, implies that the two lasers should be separated by ~12 nm if the temperature at Bob can be controlled to within 0.1° C.

II. Three-Loop Embodiment

Figure 7:
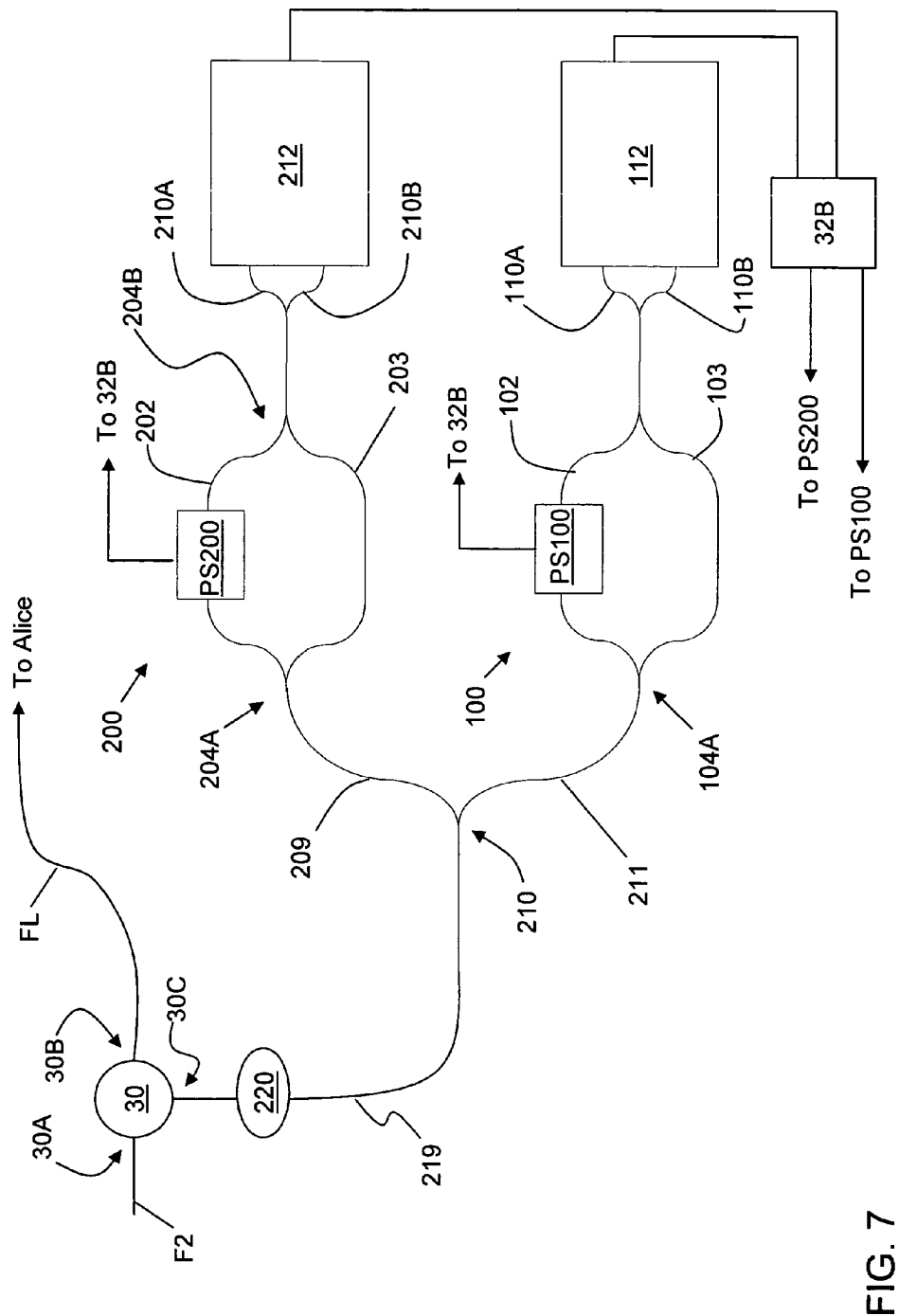
FIG. 7 is a close-up schematic diagram of an example embodiment of the QKD station Bob for a QKD system, wherein Bob includes a total of three fiber-optic interferometer loops (only two of the three are shown) and no phase modulators.

FIG. 7 shows a portion of Bob illustrating an example embodiment similar to that of FIG. 1, but wherein Bob includes an additional interferometer loop 200 and a polarization scrambler 220. Loop 200 is formed by two fiber sections 202 and 203 coupled at respective ends by PM couplers 204A and 204B. Loops 100 and 200 has respective phase shifters PS100 and PS200 in one of the fiber sections (arms). The two loops 100 and 200 are coupled to a beam-splitting device 210, such as a beamsplitting prism or a coupler, via fiber sections 209 and 211 connected to couplers 204A and 104A, respectively. Loop 200 also includes branches 210A and 210B coupled to coupler 204B. Branches 210A and 210B are connected to a second detection stage 212. Upstream of the beam-splitting device 210 and coupled thereto via optical fiber section 219 is a polarization scrambler 220.

Each loop 100 and 200 "looks" for different polarization states for signals (photons) incoming to Bob. No matter what the photon's polarization is, it will end up in one of the two loops. This increases the key rate, but it doubles the number of system components. However, this design has certain advantages. For example, there is no need for phase modulators. Instead, phase shifters PS100 and PS200 are tuned to produce the required total phase shift for the particular protocol used. Each loop also has associated therewith its own detection stage 112 and 212. Each detection stage is coupled to controller 32B, which is also coupled to and controls the operation of the phase shifters.

As described above in connection with FIG. 5, each detection stage has a single photon detector (SPD) for detecting the quantum signal. By analyzing the clicks of the respective single-photon detectors, Bob maps the data to carry out one of the standard QKD protocols (e.g., the BB84 protocol). Also, the presence of the polarization scrambler 220 obviates the need in Alice for the Faraday mirror FMA, and in an example embodiment is replaced with a regular mirror.

III. Bulk-Optics Three-Loop Embodiment

Figure 8:
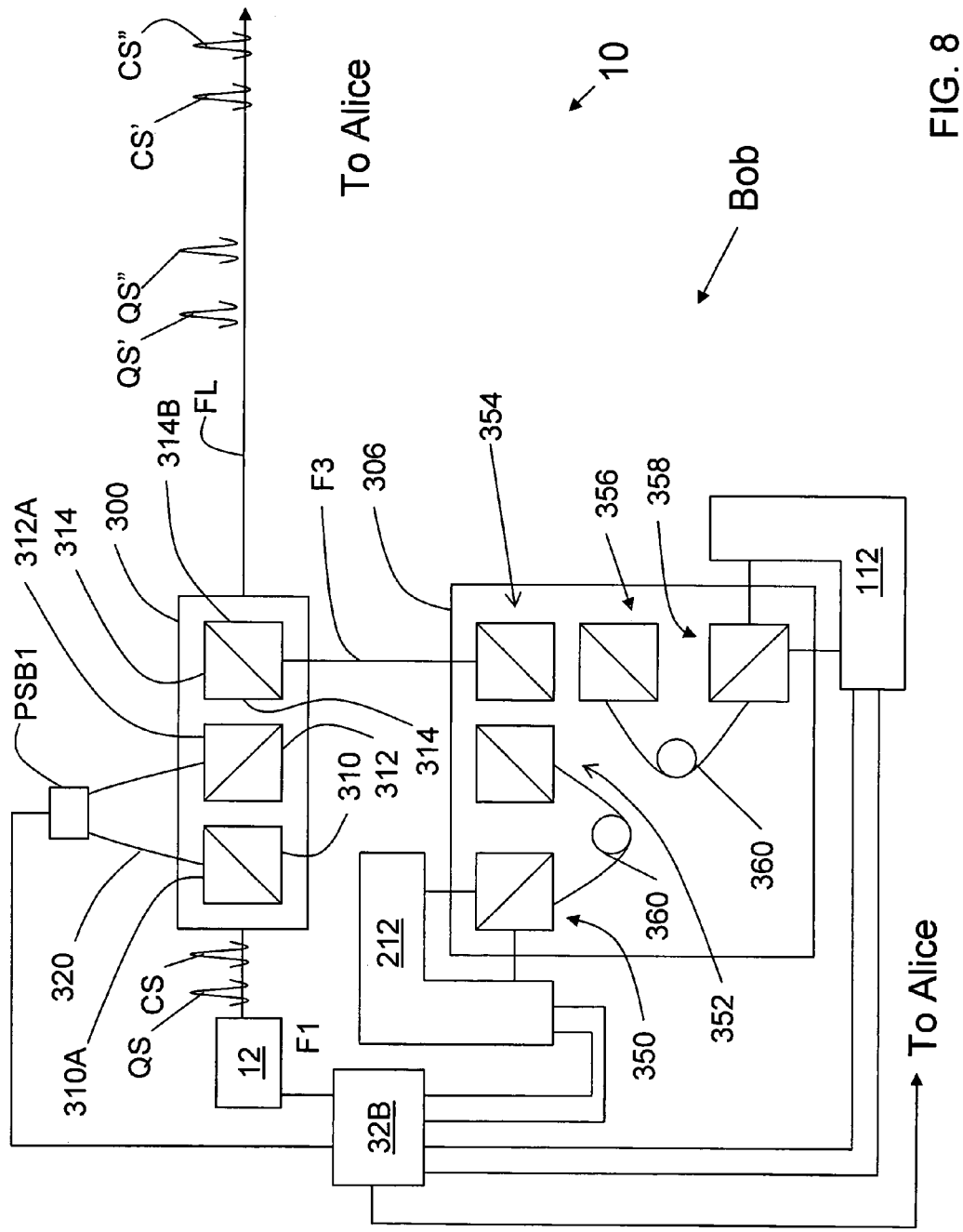
FIG. 8 is a close-up schematic diagram of an example embodiment of the QKD station Bob for a QKD system, wherein Bob includes a total of three bulk-optic interferometer loops and no phase modulators.

FIG. 8 is a schematic diagram of an example embodiment of QKD system 10 having three interferometer loops, wherein Bob employs bulk optics. The system operates in a similar manner to system 10 of FIG. 7, so only the differences in structure and operation are set forth below.

System 10 of FIG. 8 includes a first bulk optics assembly 300 and a second bulk optics assembly 306. Bulk optics assembly 300 includes, in order from left to right in FIG. 8, three prisms 310, 312 and 314. Prisms 310 and 312 are 50:50 beamspitters and prism 314 is a polarizing beam splitter. Bulk optics assembly is coupled to QCSP stage 12 via optical fiber section F1. Prisms 310 and 312 are optically coupled at their upper faces 310A and 312A via a PM optical fiber loop 320. Phase shifter PSB1 is arranged in fiber loop 320 and is coupled to controller 32B as in system 10 of FIG. 1. Prism 314 serves the role of signal-directing element 30.

Beam splitter 314 is coupled to optical fiber link FL at an output face 314B, is coupled to adjacent prism 312 at an input face 314A, and is coupled to bulk optics assembly 306 via PM optical fiber section F3 coupled to an output face 314C.

Figure 9:
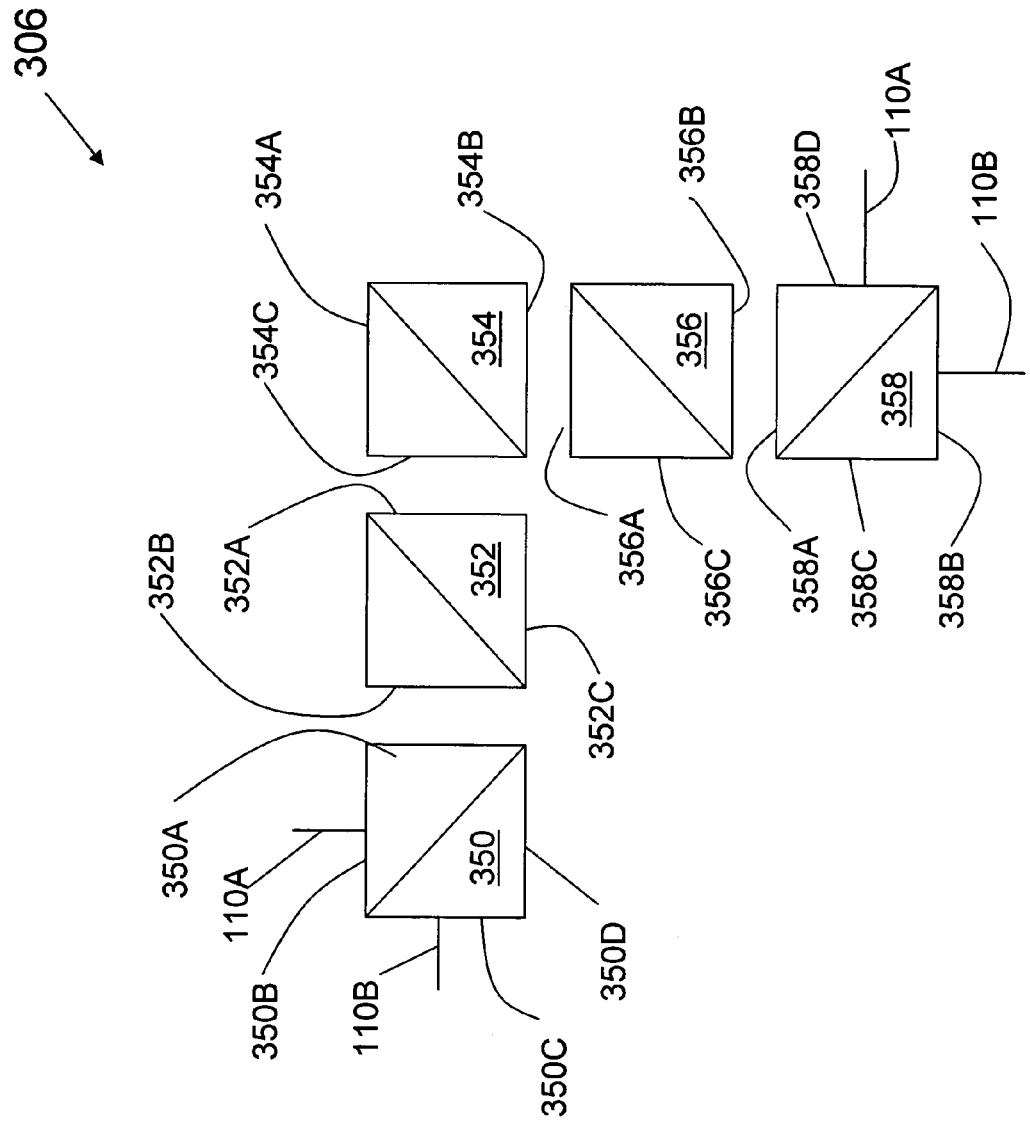
FIG. 9 is a close-up view of the second bulk-optics assembly 306 of FIG. 8.

Bulk optics assembly 306 includes five 50:50 beam splitters 350, 352, 354, 356 and 358 each having faces identified by A, B, C, . . . following the prism reference number (e.g., 350A, 350B, 350C and 350D). FIG. 9 illustrates reference numbering of the prisms and prism faces in bulk optics assembly 306.

Beam splitter 354 is coupled to optical fiber section F3 at face 354A. Prisms 352 and 350 are arranged to the left of beam splitter face 354C and prisms 356 and 358 are arranged in order adjacent prism face 354B as shown in FIGS. 8 and 9.

Detector stage 112 is arranged adjacent bulk optics assembly 306 so that it receives optical signals leaving prism faces 358B and 358C via branches (e.g., optical fiber sections) 110A and 110B, as explained above in connection with system 10 of FIG. 1. Likewise, detector stage 212 is arranged adjacent bulk optics assembly 306 so that it receives optical signals leaving prism faces 350B and 350C via branches 210A and 210B, as in system 10 explained above in connection with FIG. 7. Prisms 350 and 352 are coupled at faces 350B and 352B via an optical fiber section 360, which forms an interferometer loop. Likewise, prisms 356 and 358 are coupled to one another at faces 356C and 358C via an optical fiber section 362, which forms another interferometer loop. Adjacent prisms are also optically coupled to one another through the adjacent prism faces.

Method of Operation

With reference to FIGS. 8 and 9, in the operation of system 10, QCSP stage emits quantum and controls signals QS and CS. Like the description above, only the optical path of the quantum signals QS is discussed hereinbelow since the path of the control signals are the same but shifted in time. Quantum signal QS enters first bulk optics assembly 300 and is first incident on prism 310. The pulse is then split into two signals QS' and QS", with QS" entering optical fiber section 320, passing through phase shifter PSB1, and returning to the assembly to prism 310 at prism face 312A. Signal QS' travels straight through assembly 300, so that the two quantum signals are temporally separated by the time delay associated with the additional optical path traveled by signal QS". The two quantum signals then travel over to Alice via optical fiber link FL.

When the quantum signals return to Bob, they encounter beam splitter 314 at prism face 314B. Beam splitter 314 directs the signals to optical fiber section F3, where they proceed to second bulk optics assembly 306. The signals first encounter prism 354, which splits each signal into two signals, with one of the signals proceeding to prism 356 and one proceeding to prism 352. Thus, one pair of signals is directed to the two different bulk-optics loops in assembly 306.

In the loop that includes prisms 350 and 352 coupled by optical fiber section 360, each signal is spit by prism 352, with one part of the signal traveling directly to prism 350 while the other part of the signal travels through optical fiber section 360. The diverted signal is recombined at prism 350, and a first interfered quantum signal is detected in detector stage 212. The same splitting and detection occurs for the signals in the second loop so that a second interfered quantum signal is detected in detector stage 112.

From this point, the detection and processing of the quantum and control signals is the same as in the fiber-based three-loop embodiment discussed above.

IV. Two-Loop Embodiment with Within-Bob Stabilization

Figure 10:
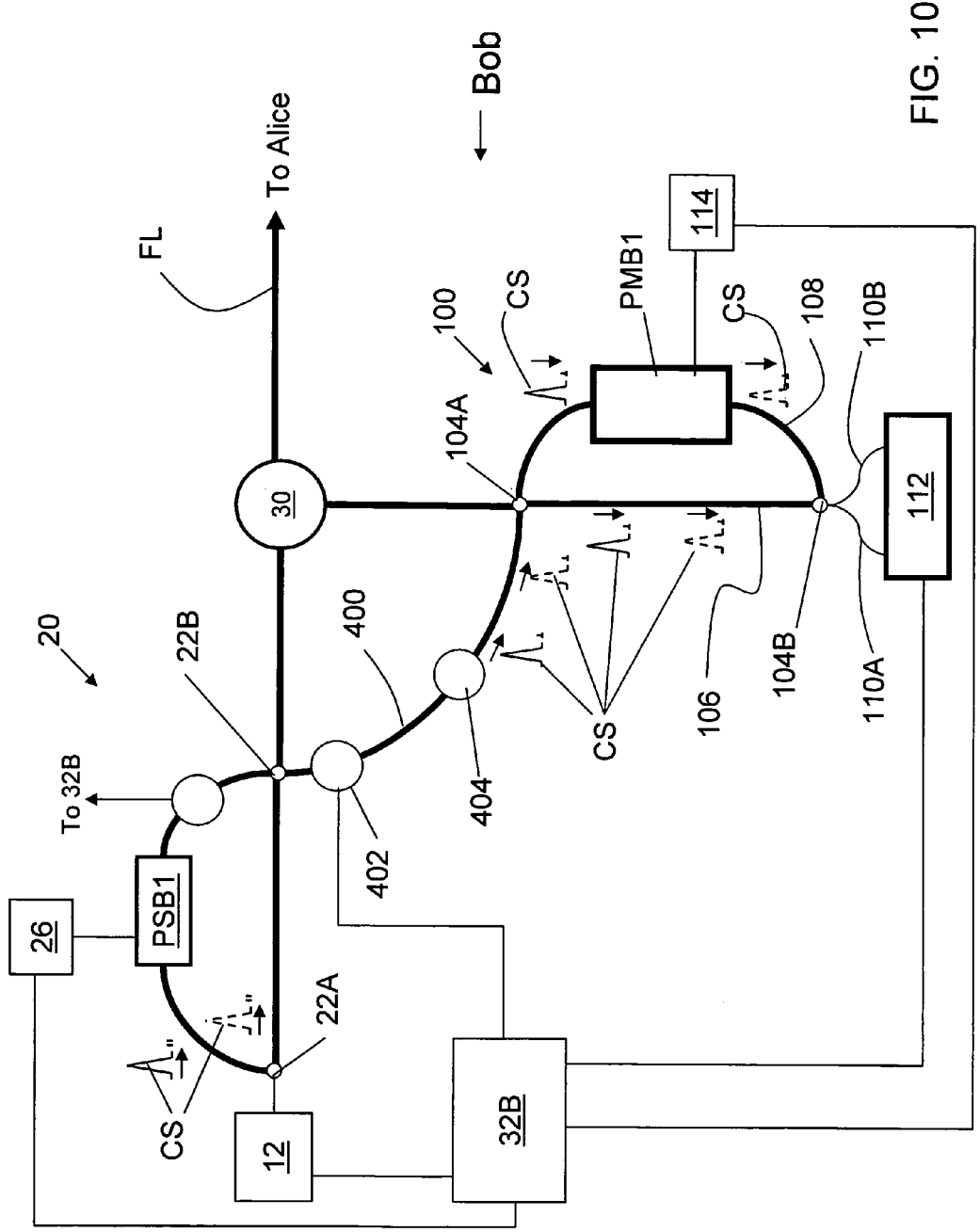
FIG. 10 is a schematic diagram of an example embodiment of a two-loop QKD station for Bob similar to that described above, but wherein the control signals CS stay within Bob.

FIG. 10 is a schematic diagram of an example embodiment of a two-loop QKD station for Bob similar to that described above, but wherein the control signals CS stay within Bob. Thus, Bob of FIG. 10 includes an additional section of PM fiber 400 coupled at one end to PM coupler 22B of loop 100. Optionally included in fiber section 400 is a PM variable optical attenuator. (VOA) 402 coupled to controller 32B. Also included in fiber section 400 is a 90° polarization rotator (e.g., a λ/2 waveplate) 404. The remaining end of fiber section 400 is coupled to PM coupler 104A of loop 100.

In an example embodiment, a PM VOA 406 coupled to controller 32B is included in arm 24A of loop 20 to attenuate the signals passing through PSB1 to balance the intensity of the signals in arms 24A and 24B.

Method of Operation

The initial operation of Bob of FIG. 10 is as described above in connection with the two-loop embodiment of FIG. 1. Thus, QCSP stage generates control signal CS and quantum signal QS (only the control signals are shown for the sake of illustration). Each of these signals is split in two at PM coupler 22A and each proceeds through loop 20. PM VOA optionally attenuates signals traveling over arm 24A. At PM coupler 22B, each of the quantum and control signals is split again, with one pair of each type of signal heading over to Alice via fiber link FL and the other pair of each type of signal entering optical fiber section 400.

In the present embodiment, the control signals sent over to Alice via fiber link FL are disregarded, and the quantum signals that travel over fiber section 400 are disregarded. The control signals CS that proceed over optical fiber section 400 are optionally attenuated by VOA 402 and the polarization of the pulses is rotated by 90° by polarization rotator 404. The polarization rotation is necessary because loop 100 is designed to receive signals that have had their polarization rotated at Alice by 90° at Faraday mirror FMA.

The two control signals CS enter loop 100 at PM coupler 104A, which divides each signal in two, yielded a total of four control signals CS, with two signals traveling over branches 106 and 108. The control signals are then recombined at PM coupler 104B and are detected and processed by detection stage 112 and controller 32B as described above. Likewise, the quantum signals returning from Alice are detected and processed as described above.

The two-way design allows for stabilization of the entire system by stabilizing Bob alone. Thus, an advantage of the present embodiment is that the control signals CS remain with Bob at all times, making them far less susceptible to manipulation by an eavesdropper. Also, since both the quantum and control signals leaving Bob can be relatively strong, the attenuation from splitting these signals a second time at PM coupler 22B is inconsequential to system performance.

V. Conclusion

Though the above-described QKD systems require active compensation for practical operation as a commercially viable QKD system, it has several advantages over the prior art. The first is that is does not require a polarization controller, which is required by the one-way system described in the '935 patent. Further, thermal compensation need only be performed at one QKD station, rather than at two, as is the case for the one-way system of the '935 patent. This is because the interferometer loops are located in a single QKD station (Bob), and additionally can be place in close proximity to one another to further simplify stabilization. Further, the design of the present invention avoids signal collisions in the phase modulator that occur in a two-way autocompensated system. This allows for a higher key rate. In addition, in the three-loop embodiments of the present invention, no phase modulators are needed at Bob, only phase shifters.

In the foregoing Detailed Description, various features are grouped together in various example embodiments for ease of understanding. The many features and advantages of the present invention are apparent from the detailed specification, and, thus, it is intended by the appended claims to cover all such features and advantages of the described apparatus that follow the true spirit and scope of the invention. Furthermore, since numerous modifications and changes will readily occur to those of skill in the art, it is not desired to limit the invention to the exact construction, operation and example embodiments described herein. Accordingly, other embodiments are within the scope of the appended claims.

What is claimed is:

1. A quantum key distribution (QKD) system comprising:
 a first QKD station that includes first and second interferometer loops, wherein the first interferometer loop generates two quantum signals from a single quantum signal generated in the first QKD station;
 a second QKD station optically coupled to the first QKD station via an optical fiber connection, wherein the second QKD station is adapted to randomly modulate at least one of the two quantum signals and return the two quantum signals to the first QKD station over the optical fiber link;
 a signal-directing element having first and second outputs and arranged in the first QKD station, and that directs the two quantum signals to the second QKD station through the first output and directs the two returned quantum signals only to the second interferometer loop through the second output; and
 a detection stage coupled to an output end of the second interferometer loop and adapted to detect two interfered quantum signals created by the second interferometer loop from the two returned quantum signals.

2. The QKD system of claim 1, wherein the second interferometer loop includes a phase modulator, and wherein the returned quantum signals that pass through the phase modulator only pass through once.

3. The QKD system of claim 1, wherein the detector stage includes:
 first and second signal demultiplexers respectively coupled to first and second input optical fibers connected to the output end of the second interferometer loop, and each adapted to separate the first and second interfered quantum signals from first and second interfered control signals formed by the second interferometer loop from first and second control signals formed by the first interferometer loop.

4. The QKD system of claim 3, wherein the detector stage further includes:
 a first photodetector and a first single-photon detector coupled to the first signal demultiplexer, and a second photodetector and a second single-photon detector coupled to the second signal demultiplexer, wherein the first and second photodetectors are adapted to detect respective interfered control signals, and wherein the first and second single-photon detectors are adapted to detect central peaks respective interfered quantum signals.

5. The QKD system of claim 4, wherein the detector stage further includes:
 a controller coupled to the first and second photodetectors and the first and second single-photon detectors, wherein the controller is adapted to process the detected interfered control signals from the first and second photodetectors to stabilize the operation of the QKD system.

6. The QKD system of claim 5, wherein the controller is adapted to determine an intensity ratio between first and second interfered control signals and send a voltage signal to a phase shifter to maintain the intensity ratio.

7. A quantum key distribution (QKD) system comprising:
 a first QKD station that includes first, second and third interferometer loops, wherein the first interferometer loop generates two quantum signals from a single quantum signal generated in the first QKD station;
 a second QKD station optically coupled to the first QKD station via an optical fiber connection, wherein the second QKD station is adapted to randomly modulate at least one of the two quantum signals and return the two quantum signals to the first QKD station over the optical fiber link;
 a signal-directing element arranged in the first QKD station that directs the two returned quantum signals to the second and third interferometer loops through a second output of the signal-directing element; and
 first and second detection stages respectively coupled to output ends of the second and third interferometer loops, respectively, wherein one arm of the second and third interferometer loops includes a phase shifter; and
 the first and second detection stages are each adapted to detect two interfered quantum signals created by one of the second and third interferometer loops from the two returned quantum signals.

8. The QKD system of claim 7, wherein each detector stage includes:
 means for separating control signals from quantum signals, wherein the control signals are sent from the first interferometer loop to the second and third interferometer loops;
 means for detecting interfered first and second control signals formed by each of the second and third interferometers; and
 means for maintaining a ratio of intensities of the interfered control signals formed by one of the second and third interferometers to stabilize the QKD system.

9. The QKD system according to claim 7, wherein the second and third interferometers are formed from bulk optical elements.

10. A method of performing quantum key distribution (QKD), comprising:
 forming two quantum signals and two control signals in a first interferometer loop of a first QKD station having first and second interferometer loops, wherein the control signals precede the quantum signals;
 transmitting the control signals and quantum signals through a first output of a signal-directing element to a second QKD station that modulates at least one of the quantum signals and returns the quantum signals and the control signals;
 receiving the two returned quantum and the two returned two control signals at the first QKD station; and
 directing the two received quantum and the two received control signals to the second interferometer loop through a second output of the signal-directing element so that the two quantum signals do not traverse the same optical path and the two control signals do not traverse the same optical path.

11. A quantum key distribution (QKD) system comprising:
a first QKD station that includes first and second interferometer loops, wherein the first interferometer loop forms two quantum signals and two control signals from a single quantum signal and a single control signal, respectively;
a second QKD station optically coupled to the first QKD station via an optical fiber connection, wherein the second QKD station is adapted to randomly modulate at least one of the two quantum signals and return the two quantum signals to the first QKD station;
a signal directing element having first and second outputs and arranged in the first QKD station, wherein the signal-directing element directs the two quantum signals to the second interferometer loop through the first output, and wherein the two returned quantum signals pass through the second output;
an optical connection in the first QKD station that connects the first and second interferometer loops such that the two controls signals from the first interferometer loop are sent directly to the second interferometer loop without traveling to the second QKD station; and
a detection stage coupled to the second interferometer loop and adapted to detect interfered control signals and interfered quantum signals formed in the second loop from the two control signals and the two returned quantum signals, respectively.

12. The system of claim 11, further including a controller coupled to the detection stage and adapted to process the interfered control signals so as to stabilize the operation of the QKD system by providing a phase shifter voltage signal to a phase shifter located in one arm of the second interferometer loop.

13. A method of performing quantum key distribution (QKD) over a QKD system, comprising:
forming quantum signals and control signals in a first interferometer loop of a first QKD station having first and second interferometer loops;
transmitting the quantum signals to a second QKD station via a first output of a signal directing element and modulating at least one of the quantum signals and returning the quantum signals to the first QKD station;
transmitting the control signals from the first loop to the second loop without the control signals passing to the second QKD station;
receiving the returned quantum signals at the first QKD station and sending the received quantum signals to the second interferometer loop through a second output of the signal-directing element so that the quantum signals do not traverse pass back the first interferometer;
detecting interfered quantum signals and interfered control signals exiting the second loop; and
stabilizing the operation of the QKD system using the detected interfered control signals.

14. The method of claim 13, wherein said stabilizing includes maintaining an intensity ratio between first and second interfered control signals by adjusting a phase in an arm of the second interferometer.

15. A method of stabilizing a quantum key distribution (QKD) system that exchanges quantum signals between first and second QKD stations, wherein the first QKD station has a at least first and second interferometer loops, the method, comprising:
sending first and second control signals from the first interferometer loop to the second interferometer loop through a first output of a signal-directing element without the control signals passing to the second QKD station;
detecting first and second interfered control signals created from the first and second control signals by the second interferometer loop, the first and second interfered control signals having respective first and second intensities $I_1$ and $I_2$; and
maintaining the ratio $I_1/I_2$ constant by adjusting the phase of one arm of the second interferometer; and
sending first and second quantum signals from the first QKD station to the second QKD station and back to the first QKD station through a second output of the signal-directing element without the first and second QKD signals traversing the same optical path, wherein the second QKD station randomly modulates at least one of the two quantum signals.

16. The method of claim 15, including forming the quantum signals and the control signals to have the same wavelength.

* * * * *